United States Patent Office 3,175,329
Patented Mar. 30, 1965

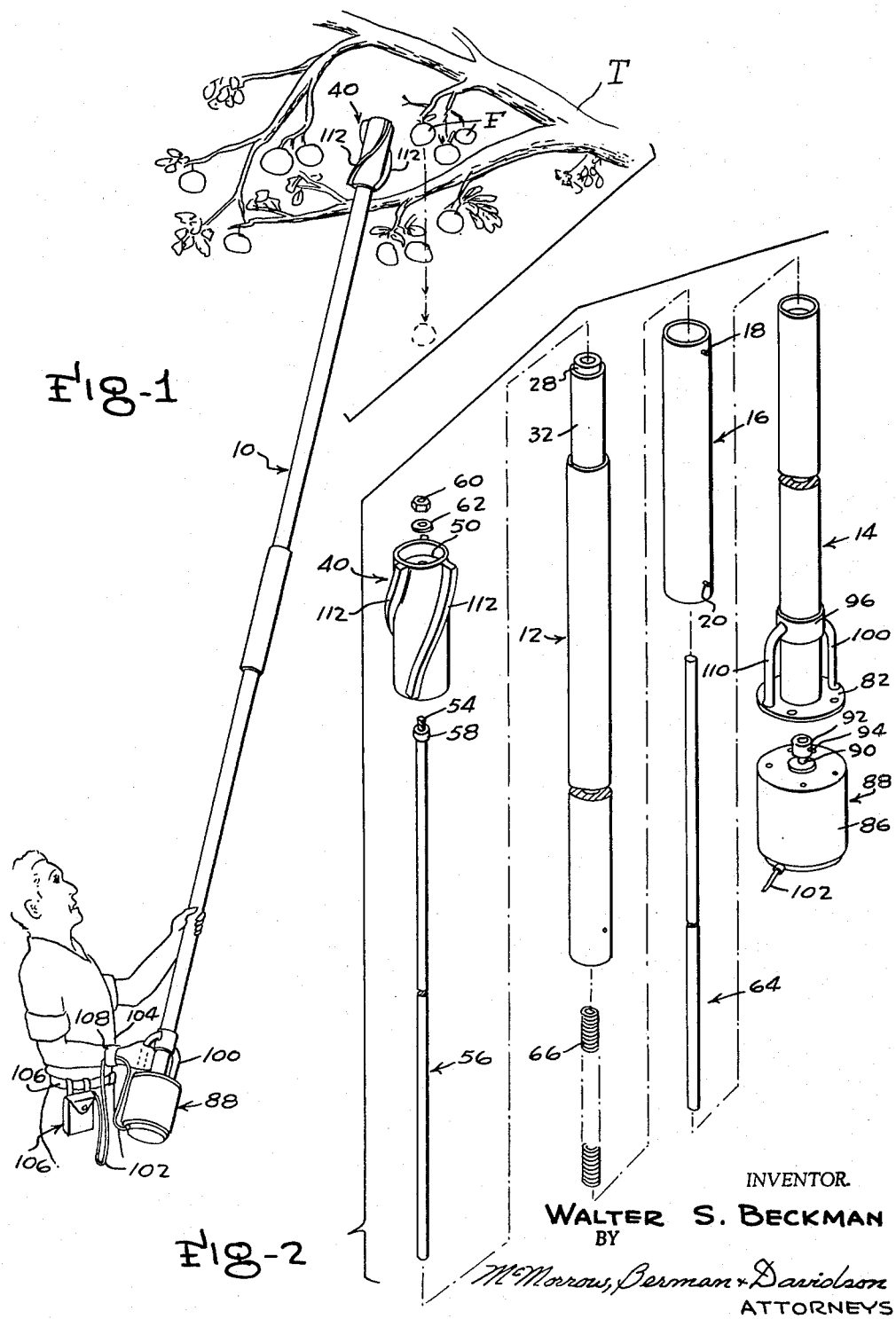

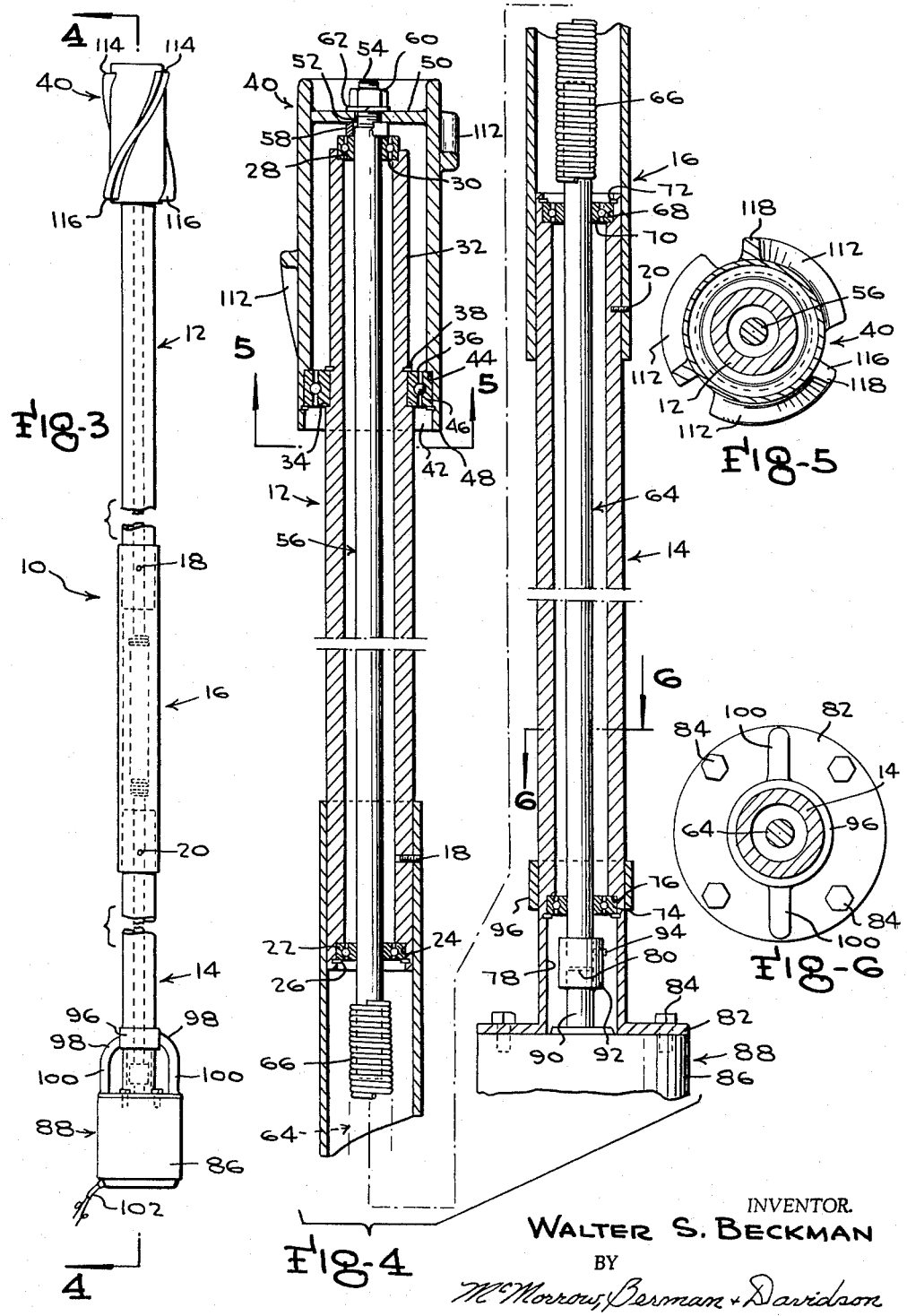

3,175,329
HAND-HELD FRUIT TREE THINNER
Walter S. Beckman, 1995 S. Belmont, Exeter, Calif.
Filed Feb. 5, 1963, Ser. No. 256,352
3 Claims. (Cl. 47—1)

This invention relates to a novel hand-held power-driven fruit tree thinner.

The primary object of the invention is the provision of an efficient, and easily used thinner of the kind indicated, with which a worker can more accurately and more quickly remove immature fruit from trees and achieve more equal spacing of the remaining fruit for the better growth thereof, than is attainable by present means, manual or otherwise, whereby money and labor are saved over slower and less accurate means, and a greater number of trees can be thinned in a given period.

Another object of the invention is the provision of a simple, lightweight, and durable thinner of the character indicated above, which involves a rotary thinning head, on the upper end of a reach rod, which has circumferentially spaced vertical spiral ribs, which, because of their spiralling form, more easily and effectively remove immature fruit from tree branches, despite that the thinning head may be held at different angles relative to the fruit, whereby fatiguing manipulative effort on the part of the worker, ordinarily required for positioning a thinning head, or the like, relative to the fruit, is substantially reduced or eliminated.

A further object of the invention is the provision of a thinner of the character indicated, wherein the reach rod carries an electric motor, at its lower end, and has handles adjacent to the motor, and a battery pack is held or otherwise carried by the worker, which is connected by a flexible cord to the motor, whereby the weight and mass of the battery pack and its appurtenances do not add to the weight of and reduce the maneuverability of the thinner.

Other important objects and advantageous features of the invention will be apparent from the following description and the accompanying drawings, wherein, for purposes of illustration only, a specific form of the invention is set forth in detail.

In the drawings:

FIGURE 1 is a schematic perspective view showing a worker carrying a battery pack of and manually manipulating a thinner, in accordance with the present invention, relative to fruit on a fruit tree;

FIGURE 2 is an enlarged, contracted exploded perspective view of the thinner and its components;

FIGURE 3 is a contracted side elevation, on the scale of FIGURE 2, of the assembled thinner;

FIGURE 4 is a contracted and further enlarged vertical transverse section taken on the line 4—4 of FIGURE 3, a part being broken away; and FIGURES 5 and 6 are horizontal sections taken on the lines 5—5 and 6—6, respectively, of FIGURE 4.

Referring in detail to the drawings, wherein like numerals designate like parts throughout the several views, the illustrated thinner comprises a straight, vertically elongated reach rod 10, of a length appropriate to reach to the level at which fruit F are to be removed from a fruit tree T.

The reach rod 10 comprises spaced upper and lower tubular sections 12 and 14, respectively, of suitable material, such as plastic or lightweight metal, which are separably joined by a coupling sleeve 16, into which the sections are telescoped, and held in place, as by means of upper and lower screws 18 and 20, respectively, threaded through the sleeve into the sections.

The upper reach rod section 12 has a lower internal annular anti-friction bearing 22 secured in an annular recess 24, in its lower end, as by means of removable pins 26. On the upper end of the section 12, an upper internal annular anti-friction bearing 28 is seated in an annular recess 30.

An upper part 32 of the upper section 12 is reduced in outside diameter, to the upper end of the section and defines an external shoulder 34, which acts as a seat for an external annular anti-friction bearing 36, which is held against the shoulder, as by means of removable pins 38.

A hollow cylindrical thinner head 40, larger in diameter than the upper reach rod section 12, and longer than its reduced portion 32, is circumposed on the portion 32 and extends thereabove. The head 40 has an internal annular recess 42, opening to its lower end, which defines an internal annular shoulder 44 which bears upon the outer race 46 of the bearing 36, with removable pins 48, on the head, engaged with the underside of the race 46.

Adjacent to the upper end of and extending across the interior of the head 40 is a horizontal web 50, formed with a central opening 52, through which extends a threaded terminal 54, on the uepr end of an upper drive shaft section 56, which is journalled through the upper and lower internal bearings 28 and 22, respectively. A spacer washer 58 is circumposed on the shaft section 56, between the upper bearing 28 and the underside of the web 50, and a nut 60, underlaid by a washer 62, is threaded on the terminal 54, against the upper side of the web 50.

The upper drive shaft section 56 extends below the lower end of the upper reach rod section 12, and is operatively connected to the upper end of a lower drive shaft section 64, by means of non-rotary securement of the adjacent ends of the shaft sections in a shock absorbing flexible coil spring coupling 66.

The lower drive shaft section 64 extends above the upper end of the lower reach rod section 14 and is journalled therein. The lower reach rod section 14 has an internal annular recess 68, in its upper end, in which is seated an upper internal annular anti-friction bearing 70, held down in place, as by removable pins 72. A lower annular anti-friction bearing 74 is seated upwardly against an internal annular shoulder 76, spaced above the lower end of the rod section 14, and defined by an annular recess 78, which opens to the lower end of the section 14. The lower drive shaft section 64 is journalled through the bearings 70 and 74, and extends below the lower bearing 74, and has its lower end 80 spaced upwardly from the lower end of the section 14.

The lower reach rod section 14 has an external annular flange 82, around its lower end, to whose underside is secured, as by means of studs 84, the upper end of the cylindrical casing 86 of an electric motor 88. The motor 88 has an upstanding shaft 90, aligned with the lower drive shaft section 64, which has a coupling socket 92, on its upper end, which receives the lower end of the shaft section 64, which is secured in place, as by means of a set screw 94. This coupling of the lower drive shaft section 64 to the motor shaft 90 opposes the connection of the upper drive shaft section 56 to the web 50 of the thinner head 40, so as to preclude unwanted endwise movements of the drive shaft sections and the thinner head 40, relative to the reach rod 10.

A band 96 surrounds the lower reach rod section 14, in the region of the lower internal bearing 74, to which the inturned upper ends 98 of a pair of diametrically opposed vertical handles 100 are fixed, the handles being suitably fixed, at their lower ends, to the flange 82 on the lower end of the reach rod section 14.

A flexible insulated cable 102, connected to the motor 88, leads out of the lower end of its casing 86, preferably through a flexible wrist band 104, to a battery pouch 106, containing a battery pack (not shown), and having belt straps 108, adapted to be engaged over a waist belt 110, worn by a worker, as shown in FIGURE 1. Other means of mounting the battery pouch 106 on the person of the worker are within the scope of the present invention. It is preferable and usually more convenient and comfortable if the battery pouch 106 be carried on the same side of the worker as the arm and hand used to grip a handle 100, with the wrist band 104 on this arm.

The thinner head 40, which is preferably fabricated of plastic or lightweight metal, is formed, on its outer surface, with a plurality, here shown as three, of vertically extending external spiral ribs 112, which are equally circumferentially spaced from each other, at relatively great distances apart.

The ribs 112, as shown in FIGURES 4 and 5, extend downwardly from upper ends 114, located adjacent to the upper end of the thinner head 40, to lower ends 116 close to the lower end of the head. The depth or diametrical dimension of the ribs 112 is greater than the width or thickness thereof, and the ribs have rounded outer edges 118. As shown in FIGURES 1 and 3, the ribs 112 are acutely angled relative to the longitudinal axis of the thinner head 40, so that with the head 40 rotating in a clockwise direction, in FIGURE 5, from left to right in FIGURES 1 and 3, while the head is held in contact with fruit F on a tree T, the ribs 112 act to cam the fruit laterally and downwardly, relative to their branches B, so that the fruit are immediately and effectively separated from the branches and fall to the ground. Because of the rotation of the head 40 and the angulations of its ribs 112, it is not necessary, as with conventional thinning devices, for the efficient removal of fruit from a tree, to laboriously manipulate the head 40 to the fruit at precise angles and to push or pull the head against the fruit to effect removal thereof.

As shown in FIGURE 1, the thinner being held in the right hand of a worker, his left hand is used to steady and direct the thinner, by grasping the reach rod 10, at a point above the handles 100. Because of the general make-up, light-weight, and vibrationless operation of the thinner, the worker is enabled to operate rapidly with enhanced efficiency and skill, with a minimum of effort and strain.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A hand-held fruit tree thinner comprising a vertically elongated reach rod composed of tubular upper and lower sections, a sleeve telescoped on and connecting the rod sections, a tubular thinner head circumposed on and journalled on the upper rod section at the upper end of the latter, said head having external vertically extending and circumferentially spaced ribs thereon, a drive shaft comprising an upper section journalled in the upper rod section, a lower drive shaft section journalled in the lower rod section, a flexible coupling connecting the shaft sections together, a motor mounted on the lower end of the lower rod section and having an upstanding shaft coupled to the lower end of the lower drive shaft section.

2. A hand-held fruit tree thinner according to claim 1, wherein said thinner head has an internal web at its upper end formed with an axial hole, said upper drive shaft section having a threaded terminal extending upwardly through the hole in the web, and a nut threaded on the terminal against the upper side of the web.

3. A hand-held fruit tree thinner according to claim 1, wherein said thinner head has an internal web at its upper end formed with an axial hole, said upper drive shaft section having a threaded terminal extending upwardly through the hole in the web, and a nut threaded on the terminal against the upper side of the web, said upper and lower rod sections having internal annular bearings at their upper and lower ends through which the drive shaft sections are journalled, said upper rod section having thereon an external annular bearing at its upper end on which the thinner head is journalled.

References Cited by the Examiner

UNITED STATES PATENTS

| 1,124,552 | 1/15 | Suggs | 143—43 |
| 2,697,457 | 12/54 | Lawrence | 56—25.4 X |
| 3,029,511 | 4/62 | Masterson | 30—167 |
| 3,077,720 | 2/63 | Grove et al. | 56—328 |

FOREIGN PATENTS

| 571,712 | 1/58 | Italy. |

ABRAHAM G. STONE, *Primary Examiner.*

T. GRAHAM CRAVER, *Examiner.*